(12) United States Patent
Robbins

(10) Patent No.: US 7,988,081 B2
(45) Date of Patent: Aug. 2, 2011

(54) CONDIMENT GRINDERS

(75) Inventor: Rodney Robbins, Florence, AL (US)

(73) Assignee: Fox Run USA, LLC, Ivyland, PA (US)

(*) Notice: Subject to any disclaimer, the term of this patent is extended or adjusted under 35 U.S.C. 154(b) by 66 days.

(21) Appl. No.: 12/383,107

(22) Filed: Mar. 18, 2009

(65) Prior Publication Data
US 2010/0237176 A1 Sep. 23, 2010

(51) Int. Cl.
*A47J 17/00* (2006.01)
*A47J 43/00* (2006.01)

(52) U.S. Cl. .................. 241/169; 241/169.1; 241/101.2

(58) Field of Classification Search .................. 241/169, 241/169.1, 101.2
See application file for complete search history.

(56) References Cited

U.S. PATENT DOCUMENTS

| | | | | | |
|---|---|---|---|---|---|
| 2,688,448 | A | * | 9/1954 | Lenz | 241/169.1 |
| 2,974,887 | A | * | 3/1961 | Grandinetti | 241/101.2 |
| 3,633,834 | A | * | 1/1972 | Nissen | 241/169.1 |
| 4,844,352 | A | * | 7/1989 | Griffin | 241/101.2 |
| 6,491,244 | B2 | * | 12/2002 | Pedersen | 241/169.1 |
| 7,637,447 | B2 | * | 12/2009 | Tang | 241/169.1 |
| 2002/0130208 | A1 | * | 9/2002 | Pedersen | 241/169.1 |
| 2008/0093489 | A1 | * | 4/2008 | Hadj-Chikh et al. | 241/169.1 |

* cited by examiner

*Primary Examiner* — Bena Miller
(74) *Attorney, Agent, or Firm* — Gregor N. Neff, Esq.

(57) ABSTRACT

Condiment grinder and dispenser in which the usual shield for protecting the adjustment screw on the end of the drive shaft is replaced and the screw is secured against accidental removal and loss by providing a stop structure which is attached to or integral part of the end of the drive shaft. This structure, unlike a shield, does not interfere with the adjustment of the coarseness of the grind produced by the grinding dispenser, and yet maintains the integrity of the device without undue complexity or manufacturing expense.

8 Claims, 6 Drawing Sheets

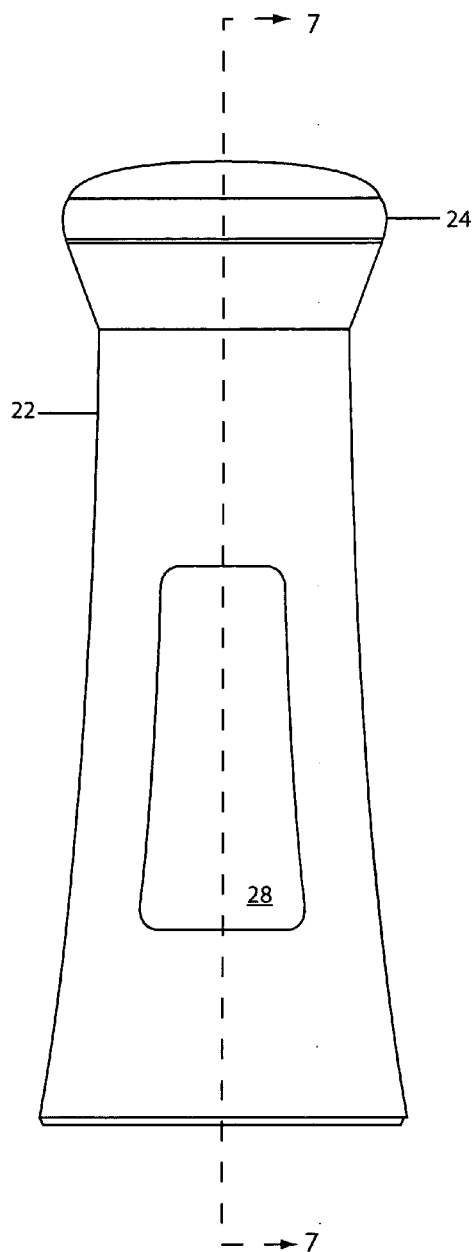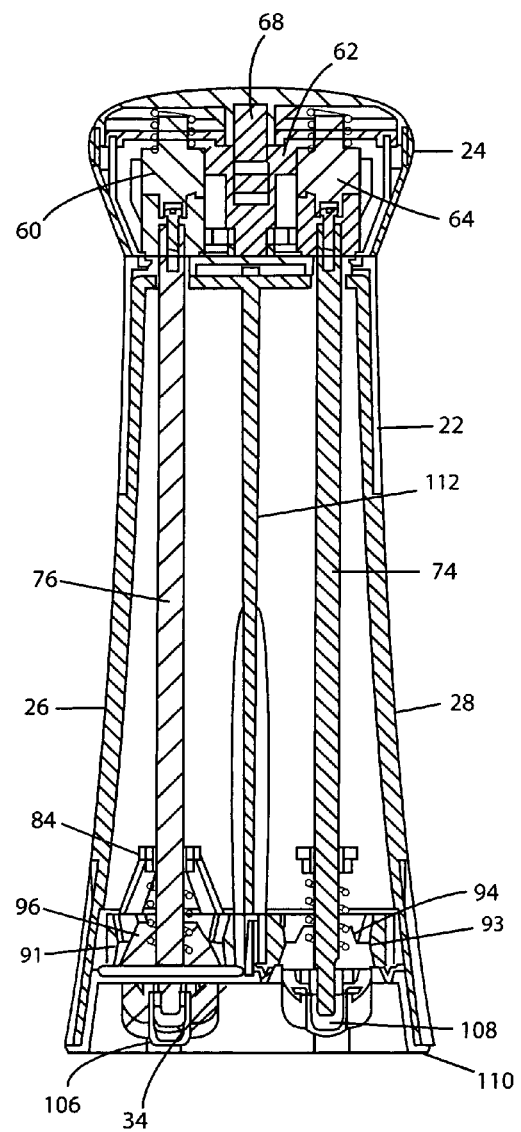
Fig. 7A
Fig. 7B

CONDIMENT GRINDERS

This invention relates to condiment grinders and particularly to condiment grinders and dispensers for selectively grinding and dispensing two different condiments, such as pepper and salt.

In the past, condiment grinders have been provided which have a drive knob which can be rotated by hand, a drive shaft, and a grinding member and "anvil" against which the grinding member bears when grinding the condiment. In one such prior grinder, a threaded adjustment screw is threaded onto the end of the shaft to vary the distance between the grinding member and the anvil to adjust the coarseness of the particles dispensed. Special shields have been provided to prevent the adjustment screw from being lost. This shield makes it hard to adjust the screw and adds to complexity of the device, and to the cost of manufacturing it, and creates cleanliness problems.

A particular problem has been experienced with two-condiment grinders which will selectively grind one of two different condiments such as pepper and salt, and have a single knob to turn in grinding a condiment. Turning the knob one direction grinds and dispenses one of the condiments, and turning the knob in the other direction dispenses the other condiment. However, the mechanism used to create this action is relatively complex and expensive to manufacture.

In grinding dispensers, and particularly in two-condiment dispenser, refilling the compartments with material to be ground often is unduly tedious and time consuming. Often this is due to overcrowding of the components in a single housing.

One of the objects of the present invention is to provide a condiment grinder and dispenser which solves or alleviates the foregoing problems.

In particular it is an object to provide such a grinder and dispenser which is relatively simple to manufacture, inexpensive to manufacture, easy and sanitary to use, and which is reliable in operation.

In accordance with the present invention, the foregoing objects are satisfied by the provision of a condiment grinder and dispenser in which the usual shield for protecting the adjustment screw on the end of the drive shaft is replaced and the screw is secured against accidental removal and loss by providing a stop structure which is attached to or an integral part of the end of the drive shaft.

This structure, unlike the shield, does not interfere with adjustment of the coarseness of the grind produced by the grinding dispenser, and yet maintains the integrity of the device without undue complexity or manufacturing expense.

In dual-direction rotary grinders which selectively dispense two different condiments from one end of the dispenser, the complexity and manufacturing cost of the drive mechanism has been reduced by the provision of gearing and a one-way clutch mechanism.

In a preferred embodiment, a first spur gear is attached to a rotary drive knob, and second and third spur gears are meshed with the first spur gear and rotate on the two drive shafts. A ratchet and pawl mechanism is provided to ensure that only one of the shafts rotates when the knob is rotated in a given direction.

Dual inlets and outlets are provided in a recessed wall at the bottom of the housing. A funnel-shaped wall is built around the entrance to each of the inlets so as to assist in filling the grinder with raw materials through the inlets in the crowded end space of the dispenser unit.

Although the preferred embodiment shown in the drawings of this application has both dispensing outlets and inlets that are located at the bottom wall of the housing, it is within the purview of this invention to provide a dual-ended dispenser with a separate dispenser for either one of the two condiments at opposite ends of the mechanism. The above-described improvements in the inlets for filling the two compartments in the dispenser, and the retention of the adjustment screws, also are used in such a dual-ended grinder.

The foregoing and other objects and advantages of the invention will be set forth in or apparent from the following description and drawings.

IN THE DRAWINGS

FIG. 7A is an enlarged side elevation view of the grinder-dispenser shown in FIGS. 1-6;

FIG. 7B is a cross-sectional view of the device shown in FIG. 7A, taken along section line 7B-7B;

Figure 2:
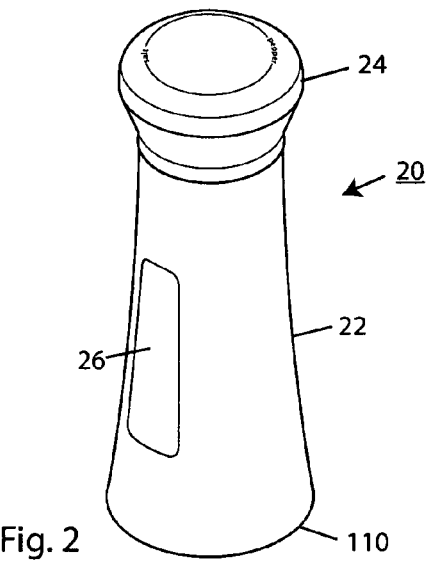
Figure 3:
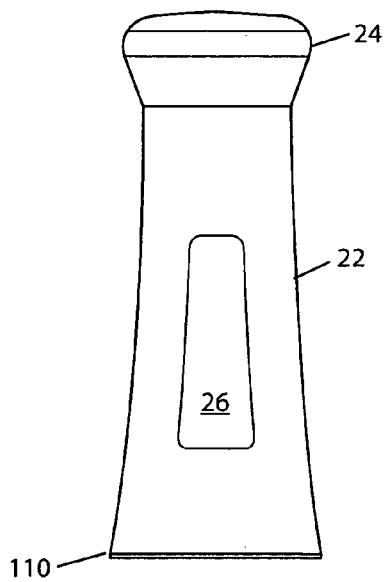

Referring first to FIG. 2, the preferred embodiment 20 of the grinder and dispenser has a body 22 with a rotary drive knob 24 mounted on its top for use in grinding and dispensing one of two different condiments stored in the body.

Figure 4:
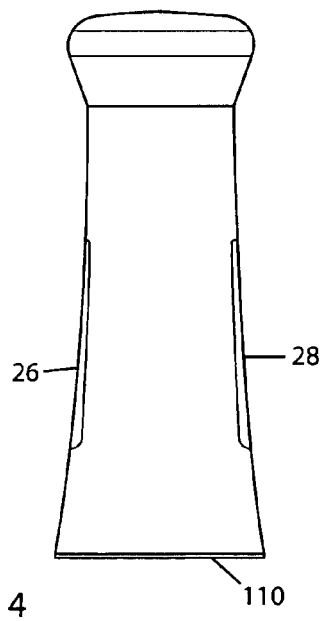

A pair of transparent windows 26 and 28 (see FIG. 4) is provided for determining the levels of materials stored in each of the two compartments inside the housing. The materials are ground and dispensed from outlets in the lower end 110 of the unit 20.

Figure 1:
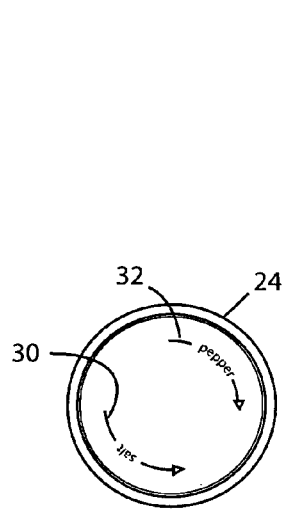
FIGS. 1 through 5, are respectively, a top plan view; a front perspective view; a left side elevation view; a front elevation view; and a bottom plan view of a two-condiment grinder and dispenser constructed in accordance with the present invention.

The unit 20 typically can be used to selectively grind and dispense coarse pepper or salt or other condiments. As it is shown in FIG. 1, the knob 24 can be rotated in one direction 32 to dispense pepper, or in the opposite direction 30 to dispense salt. The pepper normally is stored in compartments inside the unit in the form of peppercorns, and the salt often is coarse, such as coarse sea salt.

Figure 5:
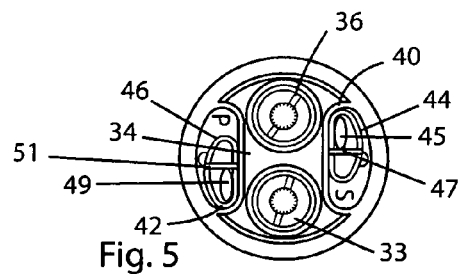

FIG. 5 shows the mechanism inside the bottom part of the housing 22. It is mounted in a bottom wall 34, which is recessed in the lower portion of the housing. The mechanism shown in FIG. 5 includes a pair of grinding mechanisms 36 and 38, and a pair of inlet openings 45 and 49 with rubber stoppers in them. Pull tabs 51 and 47 are secured to the stoppers for removing them. The stoppers are removed for filling the coarse pepper and salt into the compartments inside the dispenser.

Each inlet opening is surrounded by a frustro-conically shaped guide structure 40, 44 or 42, 46 which leads to the inlet opening so as to facilitate refilling the grinder/dispenser.

Figure 6:
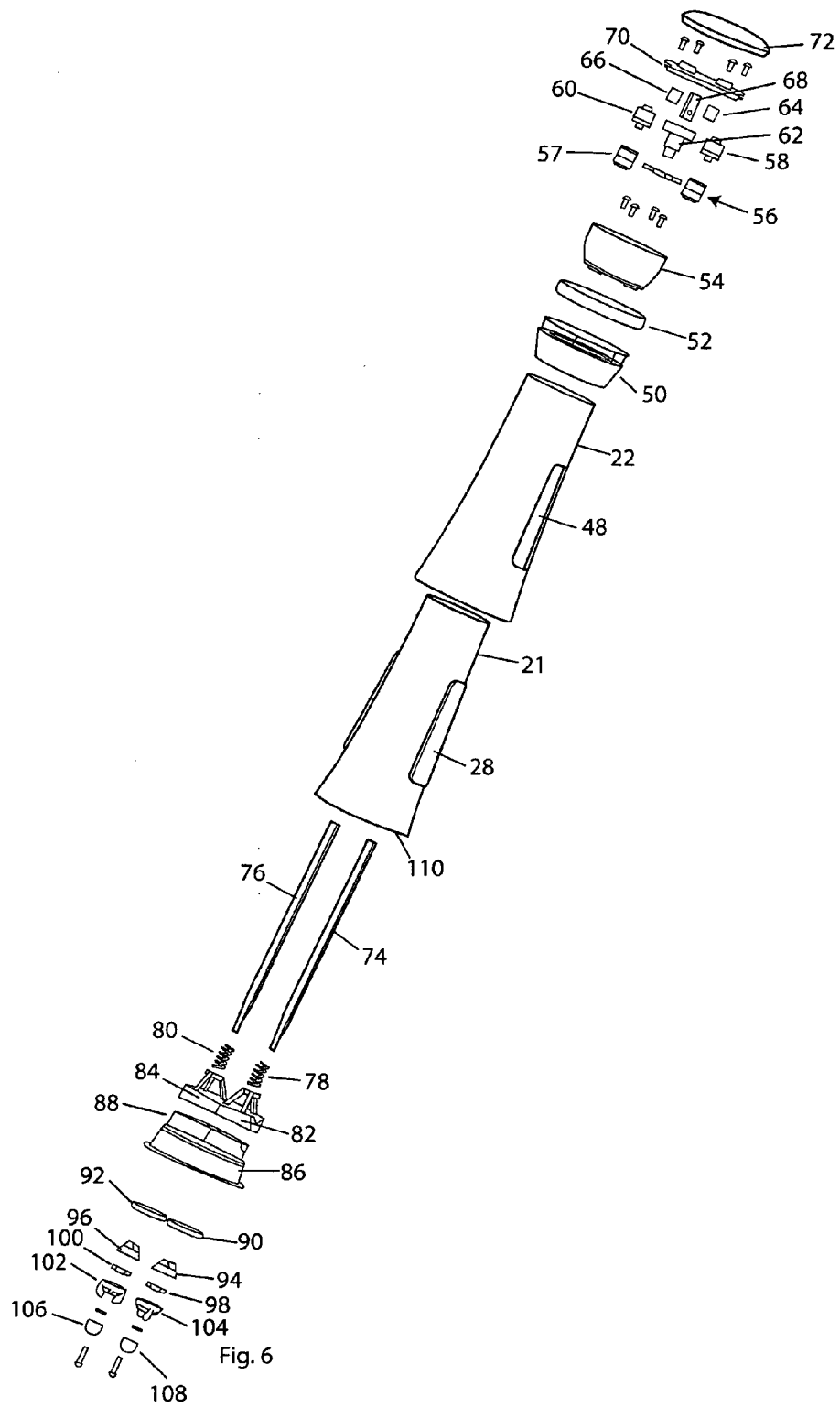
FIG. 6 is an exploded perspective view of the grinder-dispenser shown in FIGS. 1-5.

FIG. 6 is an exploded view of the grinder/dispenser 20. The housing actually consists of two separate molded plastic components 22 and 21. Component 21 is a sleeve which fits inside of a sleeve 22 with a projecting portion 26 or 28 which extends through a conforming opening in the sidewall of the unit 22.

The unit 21 is made entirely of transparent plastic, and unit 22 is made entirely of opaque plastic. The result is that the transparent windows 26 and 28 are formed by the inner member 21.

Two square cross-sectional drive shafts 74 and 76 are provided for driving grinding and dispensing mechanisms 36, 38 at the lower end of the dispenser.

As it is shown in FIG. 7B, the housing is divided into two halves by a vertical wall 112 so as to form separate compartments for the two different condiments stored in the housing.

Referring again to FIG. 6, the lower ends of the shaft 74 and 76 extend through springs 78 and 80 and support structures 82 and 84. A liner 86, 88 with funnels (not shown in FIG. 6) for funneling materials into the compartments, as described above, fits into the bottom recess of the housing. Washers 90 and 92 and grinder members 94, 96 also are shown.

Also provided are washers 98 and 100, and threaded adjustment screws 102, 104 in the form of wing nuts. Protective caps 106 and 108 are snap-fitted onto the ends of the drive shafts.

Figure 8:
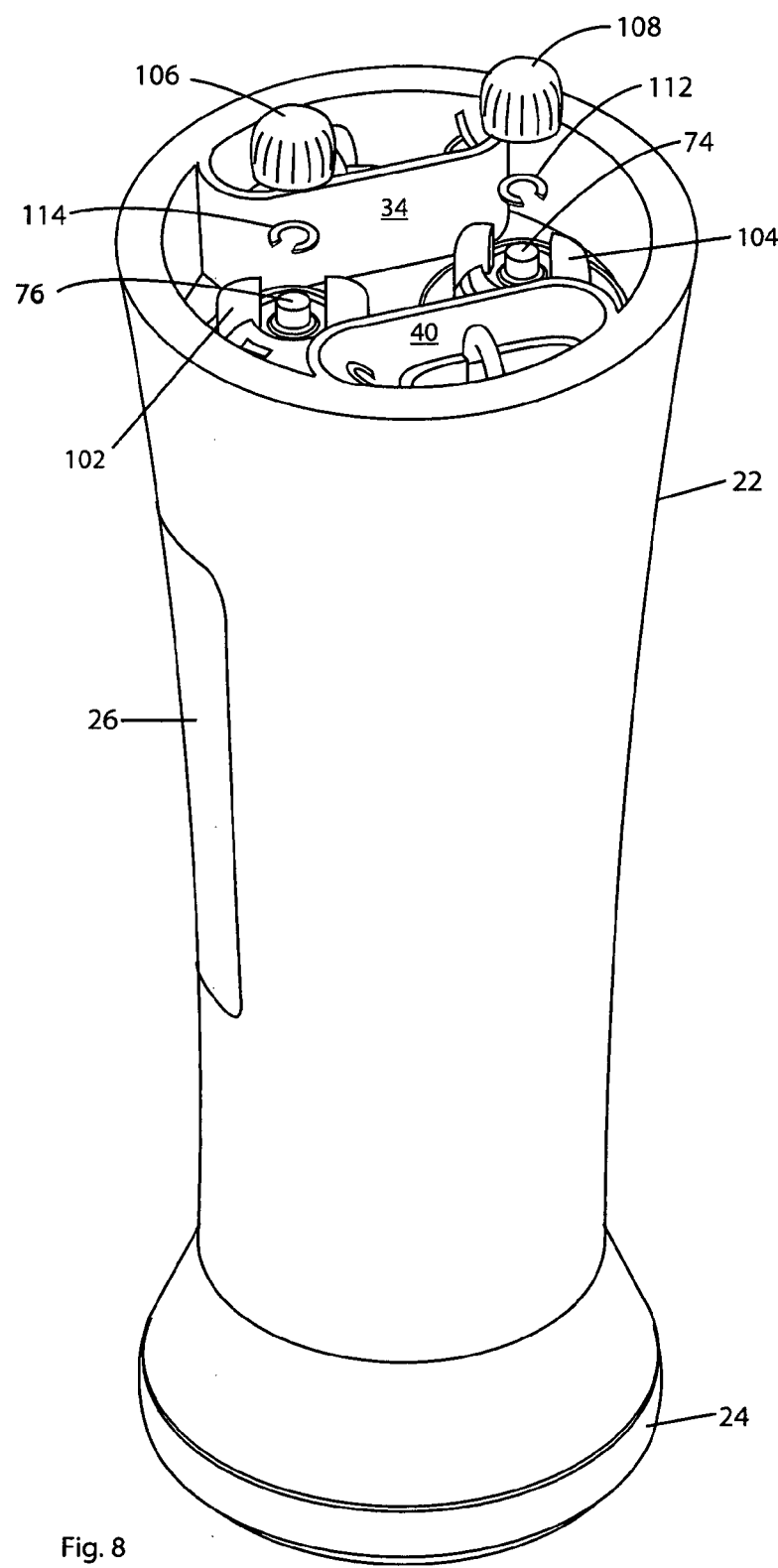
FIG. 8 is a partially exploded perspective view showing the device of FIGS. 1-6 upside-down.

As it is shown most clearly in FIG. 8, a pair of "C"-shaped clips 114, 112 are fitted into circumferential grooves on the protruding ends of the shafts 76 and 74. This construction prevents the wing nuts from falling off of the ends of their shafts or being accidentally unscrewed too far and becoming lost. This reduces the chances of disabling the grinder, simplifies the manufacture, and improves sanitation as compared with prior devices.

FIG. 8 also shows the funnel structures 40 and 34 which assist in filling the compartments of the grinder/dispenser.

As it is shown in FIG. 7B, conical grinding surfaces of the grinding elements 94 and 96 grind the materials against the sloping sides of conically-shaped elements 91, 93 which are called "anvils" herein. The spacing between each of the anvils and the associated grinder member is adjustable by means of the wing nuts 102, 104 to adjust the coarseness or fineness of the ground material produced by the grinder, as it is well known in the art. Reducing the space between the grinding member and the anvil will make the particles finer and increasing that space will make the particles coarser, as also is well known in the art.

Referring again to FIG. 6, element 50 is an outside cover with a bearing surface to reduce friction between the rotating parts and the stationary parts; item 54 is a housing for the gears in the drive mechanism; and item 52 is a rubber ring which fits into a groove in the outside surface of the knob 24, thus improving the grip of one turning the knob. Items 56, 57, 58, 60, 62, 64, 66 and 70 comprise the gear mechanism. Item 72 is the top member of the knob structure.

Figure 9:
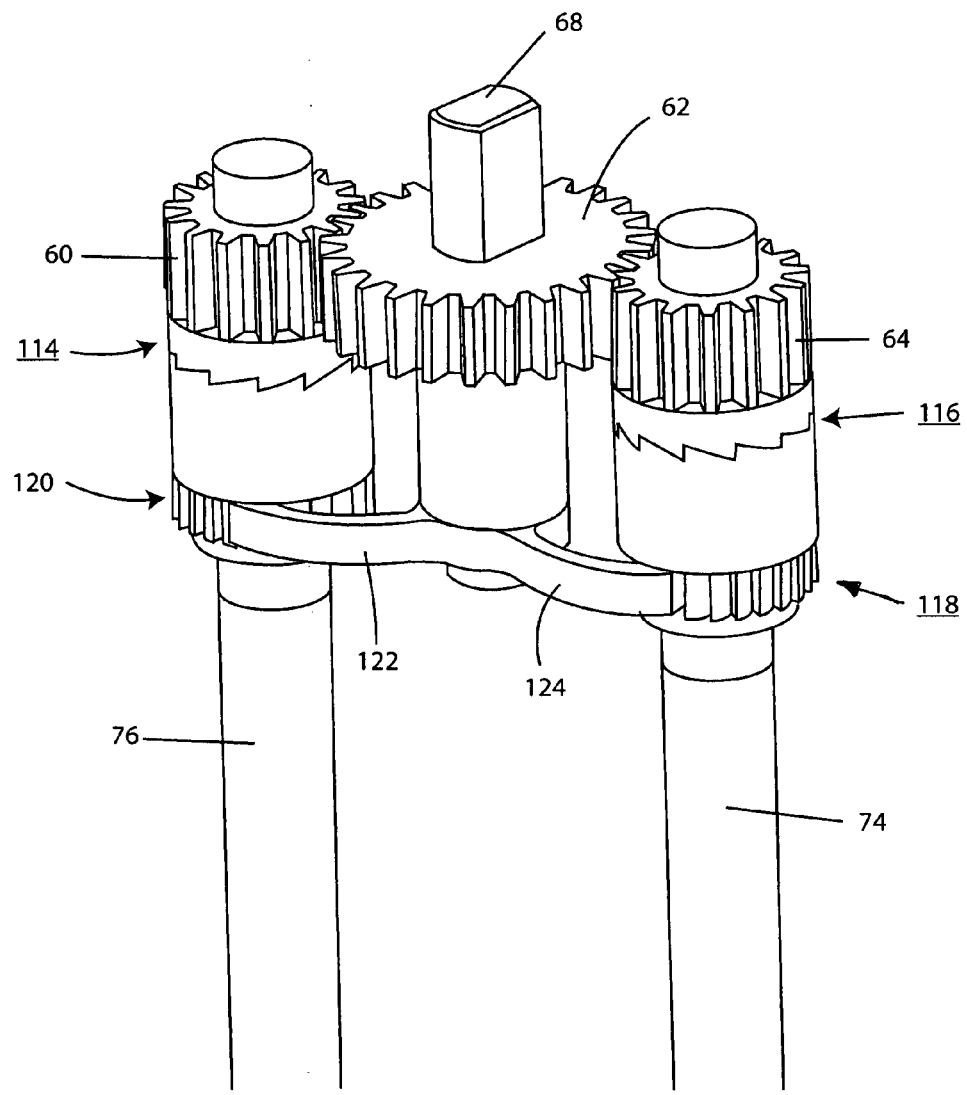
FIG. 9 is a top front perspective and partially schematic view of the drive gearing of the drive shafts of the grinder-dispenser shown in FIGS. 1-8.
Figure 10:
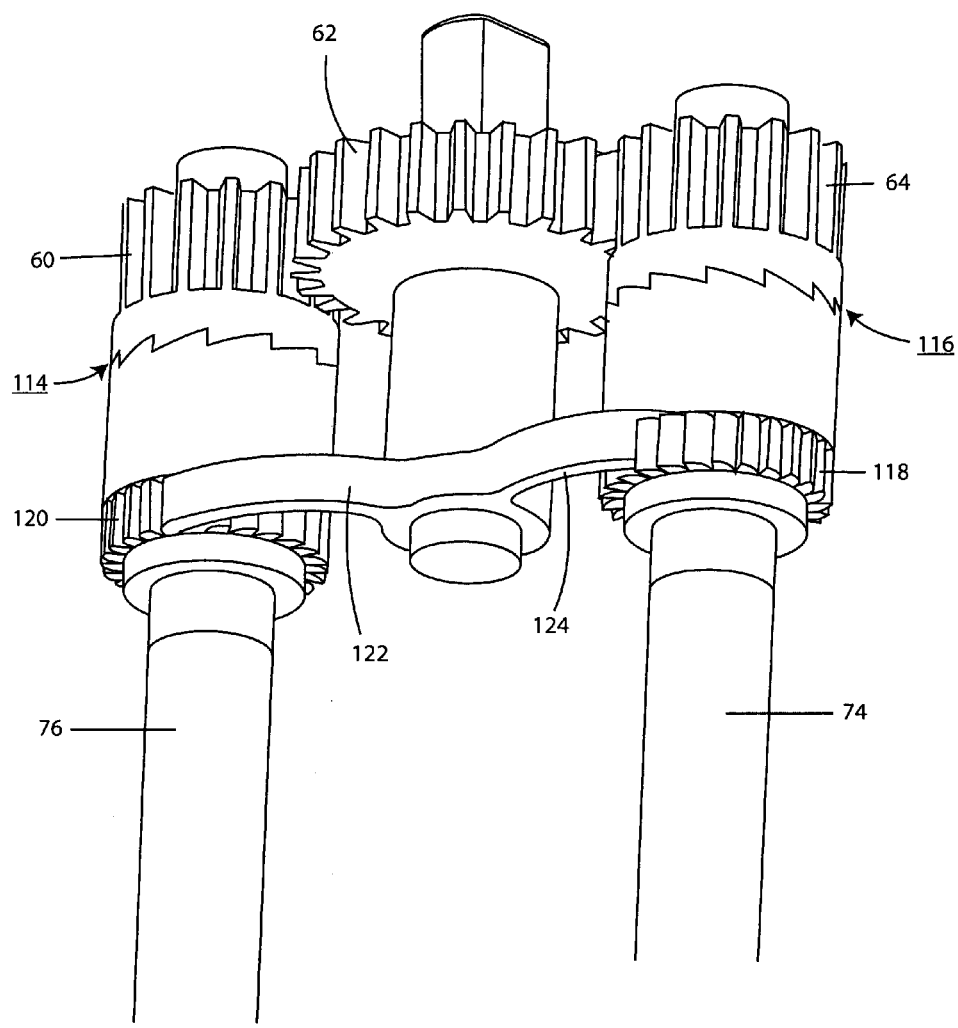
FIG. 10 is a bottom front perspective view similar to that of FIG. 9 showing the same components.

Referring to FIGS. 7B, 9 and 10, and particular to FIGS. 9 and 10, a first spur gear 62 is secured to a projection 68 which is secured to the top member 72 of the knob. Thus, spur gear 62 is directly driven by rotation of the knob.

Second and third spur gears 60 and 64 are meshed with the gear 62 and are driven by it when the knob 24 is rotated. The gears 60 and 64 are mounted to rotate on the shafts 74 and 76, and are drivably coupled to the shafts 76 and 74 through a ratchet and pawl clutch mechanism 114, 116.

One of the gears 60, 64 is drivably coupled to the shaft it is mounted on when the knob is turned in one direction, and the other of the gears 60, 64 is drivably coupled to its shaft when the knob 24 is rotated in the other direction.

The pawl construction consists of the members 118, 120 secured to their respective shafts, and the pawls 122, 124 which selectively engage the teeth on the members 118, 120.

The mechanism shown in FIGS. 9, 10 and 7B is relatively simple and inexpensive to make and trouble-free in operation.

It can be seen from the foregoing that the grinder described above meets the objectives set forth above.

An alternatively embodiment of the invention is one in which a single grinder and dispensing outlet is provided in each of the opposite ends of the device so that only one condiment is dispensed from each end. Such a grinder will use the advantageous dispensing and refilling mechanisms described above, although the gearing structure shown in FIGS. 7B, 9 and 10 is not necessary.

The above description of the invention is intended to be illustrative and not limiting. Various changes or modifications in the embodiments described may occur to those skilled in the art. These can be made without departing from the spirit or scope of the invention.

What is claimed is:

1. A condiment grinder and dispenser comprising
   a. A body member forming a housing with at least two compartments for storing and dispensing condiments to be ground, said body member having a pair of dispensing outlets,
   b. A pair of rotary grinding members, each positioned near one of said outlets to receive materials from one of said compartments and dispense ground materials through one of said outlets,
   c. A rotary drive member rotatable by hand, a drive coupling joining said grinding members to said drive member,
   d. A pair of anvils, each located near to but spaced from said grinding members by an adjustable space,
   e. Said drive coupling including a pair of drive shafts each of which is threaded at one end adjacent one of said outlets,
   f. A pair of adjustment screw members each threaded onto one of said drive shafts and rotatable to adjust said space between said grinding member and said anvil, and
   g. A pair of stop members each being located on said threaded end of one of said shafts to stop said adjustment screw member from rotating off of said threaded end, but allowing it to rotate to adjust said space.

2. A device as in claim 1 in which each of said stop members comprises a clip fitted into a circumferential groove in said threaded end of one of said shafts.

3. A device as in claim 1 in which the condiment in one of said compartments is salt, and the condiment in the other compartment is pepper.

4. A device as in claim 1 in which said drive coupling comprises a first gear secured to rotate with said rotary drive member, second and third gears meshed with said first gear, each of said second and third gears being mounted to rotate on one of said drive shafts, and a ratchet and pawl clutch mechanism to cause one of said shafts to be rotated when said rotary drive member is rotated in one direction, and the other of said shafts to be rotated when said rotary drive member is rotated in the opposite direction.

5. A condiment grinder and dispenser comprising
   a. A body member forming a housing with at least one compartment for storing and dispensing a condiment to be ground, said body member having a dispensing outlet,
   b. A rotary grinding member, positioned near said outlet to receive materials from said compartment and dispense ground materials through said outlet,
   c. A rotary drive member rotatable by hand, a drive coupling joining said grinding member to said drive member,
   d. An anvil, near to but spaced from said grinding member by an adjustable space, e. Said drive coupling including a drive shaft threaded at one end adjacent said outlet, f. An adjustment screw threaded onto said drive shaft and rotatable to adjust said space between said grinding member and said anvil, and g. A stop member on said threaded end of said shaft to stop said adjustment member from rotating off of said threaded end, but allowing it to rotate to adjust said space, in which said outlet, grinding member anvil and adjustment screw member are mounted in a wall in a recess formed in the bottom end of said body member, said wall having an inlet opening with a removable stopper for use in filling said compartment, and a conically-shaped wall forming a funnel to assist in filling said compartment with a condiment to be ground.

6. A grinder for selectively grinding and dispensing either of two different condiments, said grinder comprising a. A body member having two storage compartments, each with an inlet opening and an outlet opening exiting from the same end of said body member, b. Two grinder member and anvil pairs, each positioned to receive and grind materials from one of said compartments, c. Two drive shafts, each coupled to one of said grinder member and anvil pairs, d. A single grinder drive knob accessible from outside said body member drive gearing and a one-way clutch mechanism for rotating one of said shafts when said drive knob is rotated in one direction, and for rotating the other of said shafts when said drive knob is rotated in the opposite direction, and e. A pair of adjustment screw members for adjusting the coarseness of dispensed ground material, the lower ends of said shafts being threaded, each of said screw members being threaded on said lower end of one of said shafts, and a stop member at the end of each shaft to prevent loss of said adjustment screw members without impairing its adjustment function.

7. A device as in claim 6 in which said drive gearing and one-way clutch mechanism comprises a first spur gear drivably coupled to said drive knob, second and third spur gears, each mounted to rotate on one of said shafts and meshed with said first spur gear, and a ratchet and pawl mechanism to cause one of said shafts to rotate when said knob is rotated in one direction, and to cause the other of the shafts to rotate when said knob is rotated in the opposite direction.

8. A grinder for selectively grinding and dispensing either of two different condiments, said grinder comprising a. A body member having two storage compartments, each with an inlet opening and an outlet opening exiting from the same end of said body member, b. Two grinder member and anvil pairs, each positioned to receive and grind materials from one of said compartments, c. Two drive shafts, each coupled to one of said grinder member and anvil pairs, d. A single grinder drive knob accessible from outside said body member, drive gearing and a one-way clutch mechanism for rotating one of said shafts when said drive knob is rotated in one direction, and for rotating the other of said shafts when said drive knob is rotated in the opposite direction, and including a funnel-shaped guide around each of said inlet openings and a removable stopper for each of said inlet openings.

\* \* \* \* \*